M. C. A. LATOUR.
ALTERNATING CURRENT DYNAMO.
APPLICATION FILED JAN. 19, 1904.

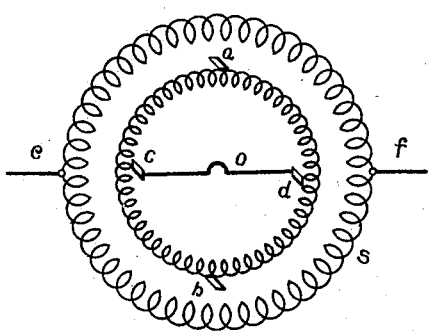
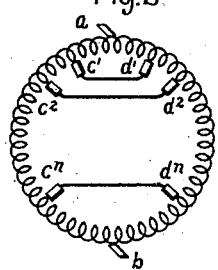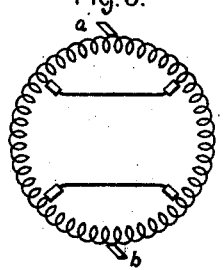
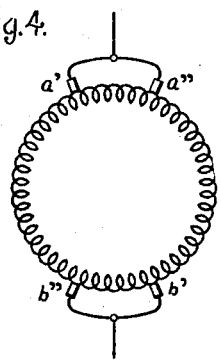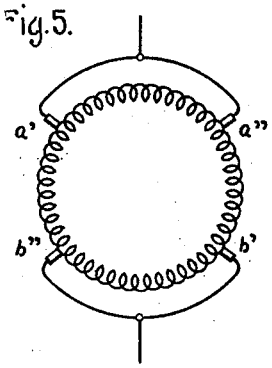

1,016,021.

Patented Jan. 30, 1912.

2 SHEETS—SHEET 2.

Witnesses:
Harold F. Locke.
Helen Oxford

Inventor:
Marius C.A. Latour.
By Albert G. Davis
Att'y.

UNITED STATES PATENT OFFICE.

MARIUS CHARLES ARTHUR LATOUR, OF SÈVRES, FRANCE, ASSIGNOR TO GENERAL ELECTRIC COMPANY, A CORPORATION OF NEW YORK.

ALTERNATING-CURRENT DYNAMO.

1,016,021.      Specification of Letters Patent.     Patented Jan. 30, 1912.

Application filed January 19, 1904. Serial No. 189,739.

*To all whom it may concern:*

Be it known that I, MARIUS CHARLES ARTHUR LATOUR, a citizen of France, residing at Sèvres, Department of Seine-et-Oise, France, have invented new and useful Improvements in Alternating-Current Dynamos, of which the following is a specification.

My present invention relates to alternating-current machines of the commutator type and its object is to provide a single-phase self-exciting machine which may be used as a generator or motor.

My invention will be better understood by reference to the following description taken in connection with the accompanying drawings, in which—

Figure 6:
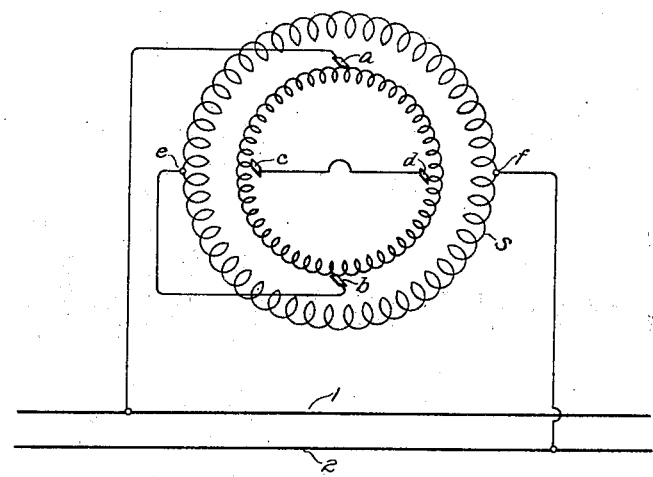
Figure 7:
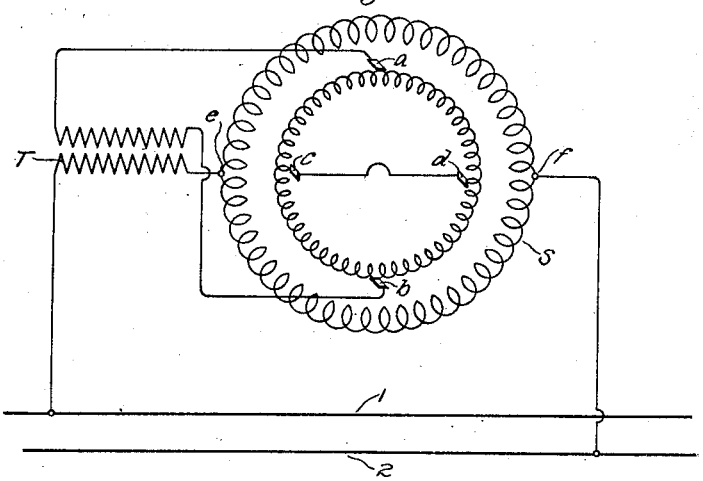

Figure 1 is a diagrammatic illustration of my single-phase self-exciting dynamo; Figs. 2 and 3 are diagrams illustrating the application of one form of my present invention to a dynamo of the type illustrated in Fig. 1; Figs. 4 and 5 are diagrammatic illustrations of another form of my invention; and Figs. 6 and 7 show the preferable connections of the machine.

A dynamo arranged in accordance with my invention comprises a stator or primary member $s$ similar to the stator of an ordinary induction motor (Fig. 1), provided with a winding which is adapted to be connected through terminal connections $e\ f$ with a source of single-phase current, and a rotor or secondary member which is provided with a distributed winding connected to the segments of a many-part commutator, like the armature of a direct-current dynamo-electric machine. This rotor in a bi-polar machine is provided with two commutator brushes $a\ b$ displaced from each other by 180° and displaced from the line of primary magnetization by substantially 90°. The stator and rotor windings of the dynamo may be connected either in shunt or in series by connecting the terminals of the primary winding and the commutator brushes of the secondary member in parallel or in series either directly or through the medium of transformers. Thus in Fig. 6 the primary and secondary members are shown connected directly in series with each other and to the line-wires or other suitable source of single-phase current 1—2, and Fig. 7 shows the primary and secondary members connected in series with each other through a transformer T, the primary member being connected in series with the primary of the transformer to the line, and the brushes $a\ b$ being connected to the secondary of the transformer.

In order to make the dynamo self-exciting, it is only necessary to provide the commutator with brushes $c\ d$ disposed along a line substantially parallel with the line of primary magnetization and displaced by 90° from the line of the brushes $a\ b$, and to provide the brushes $c\ d$ with a short-circuiting connection. With such an arrangement the inductance of the rotor disappears at synchronous speed and becomes negative above synchronism, and everything takes place as if poly-phase currents were supplied to the rotor winding. Moreover, perfect commutation is obtained in the neighborhood of synchronous speed.

In reality it is the introduction of the simple short-circuit through the brushes $c\ d$ which renders possible the construction of a self-exciting single-phase machine. Without the short-circuit through the brushes $c\ d$ we have only the single-phase commutator machine well known for its sparkling and its low power factor at ordinary frequencies. It is possible, however, to provide an indefinite number of circuits joining points which are equipotential with reference to the circuit through the brushes $a\ b$, and in Fig. 2 of the drawing I have shown a number of sets of short-circuiting brushes $c^1\ d^1\ c^2\ d^2\ c^n\ d^n$ disposed as above specified. By providing a plurality of sets of short-circuiting brushes positioned as above described the difficulties of commutation in each short-circuit may be indefinitely reduced and we may hope to be able to operate the machine at speeds differing considerably from the synchronous speed. In practice it will generally be sufficient to provide two sets of short-circuiting brushes, the brushes of the two sets being separated on the commutator by about 60°, as shown in Fig. 3.

Instead of supplying single-phase current to the rotor winding through a single set of brushes $a\ b$, a plurality of sets of brushes may be employed, as shown in Fig. 4, in which the single-phase current is led into the rotor winding through the two brushes $a'\ a''$ connected in parallel and is led away from the said winding by means of the two brushes $b'$ $b''$ also connected in multiple. The connection of the brushes $a'$ $a''$ and $b'$ $b''$ in multiple, as shown in Fig. 4, produces two short-circuits for the rotor winding along a line displaced by 90° from the line of the brushes through which the single-phase current is supplied to the rotor winding, so that it is possible by combining the arrangements of Figs. 3 and 4 to obtain the arrangement shown in Fig. 5, in which the brushes $a'$ $a''$ and $b'$ $b''$ are so positioned on the commutator that they will operate effectively both to produce the desired short-circuits for the rotor winding and to supply the magnetizing current thereto.

The characteristic properties of a machine of the type above described are that it has a perfect commutation at synchronism and is capable of being operated at synchronism without dephasing (that is, with unity power factor), and the arrangements constituting my present invention while maintaining these characteristic properties have for a further object to permit the machine to be operated without danger during the period of starting.

It is to be noted that the arrangement of the short-circuits is such that the flux of the stator will always be annulled by static induction in the winding of the rotor, while no screening effect takes place with respect to the flux of the rotor.

What I claim as new and desire to secure by Letters Patent of the United States, is,

1. In a single-phase machine, a primary member adapted for connection to a single-phase source, a secondary member having a distributed winding connected at intervals to the segments of a many-part commutator, a set of brushes short-circuiting the secondary winding on a line substantially parallel to the line of primary magnetization, and another set of brushes displaced substantially 90 electrical degrees from the first set of brushes connected in series with the primary winding of the machine.

2. In a single-phase machine, a primary member adapted for connection to a single-phase source, a secondary member having a distributed winding connected at intervals to the segments of a many-part commutator, a set of brushes short-circuiting the secondary winding on a line substantially parallel to the line of primary magnetization, and another set of brushes displaced substantially 90 electrical degrees from the first set of brushes connected through a transformer in series with the primary winding of the machine.

3. In an alternating-current motor, a primary winding adapted to be connected to a source of current, a secondary winding provided with commutator and brushes in inductive relation thereto, a transformer having its primary connected in series with one of said windings, and means for connecting the secondary of said transformer to points on one of said windings intermediate the terminals thereof.

4. In an alternating-current motor, a primary winding adapted to be connected to a source of current, a secondary winding provided with commutator and brushes in inductive relation thereto, a transformer having its primary in series with said primary winding, and means for connecting the secondary of said transformer to points on the secondary winding of the motor intermediate the terminals thereof.

5. In an alternating-current motor, a distributed winding adapted to be connected to a source of single-phase current, a secondary winding having a system of brushes short-circuited on the line of the primary field, and a second system of brushes displaced by ninety electrical degrees from the first system, and a series transformer having its secondary connected to said second system of brushes and its primary connected in series with the primary winding of the motor.

In witness whereof, I have hereunto set my hand this seventh day of January, 1904.

MARIUS CHARLES ARTHUR LATOUR.

Witnesses:
A. S. GARFIELD,
HANSON C. COXE.